US012754382B2

(12) United States Patent
Zeng et al.

(10) Patent No.: US 12,754,382 B2
(45) Date of Patent: Oct. 6, 2026

(54) TRANSISTOR-OUTLINE PACKAGE AND PREPARATION METHOD THEREOF, OPTICAL SUB-ASSEMBLY, OPTICAL MODULE, AND OPTICAL NETWORK SYSTEM

(71) Applicant: Huawei Technologies Co., Ltd., Shenzhen (CN)

(72) Inventors: Yujie Zeng, Wuhan (CN); Fei Gao, Wuhan (CN); Tao Liu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 226 days.

(21) Appl. No.: 18/593,421

(22) Filed: Mar. 1, 2024

(65) Prior Publication Data

US 2024/0201457 A1 Jun. 20, 2024

Related U.S. Application Data

(63) Continuation of application No. PCT/CN2021/125365, filed on Oct. 21, 2021.

(51) Int. Cl.
*G02B 6/42* (2006.01)

(52) U.S. Cl.
CPC ......... *G02B 6/4215* (2013.01); *G02B 6/4239* (2013.01); *G02B 6/4244* (2013.01); *G02B 6/4263* (2013.01)

(58) Field of Classification Search
CPC ........................................................ G02B 6/42
USPC ............................................................ 385/33
See application file for complete search history.

(56) References Cited

U.S. PATENT DOCUMENTS 7,372,039 B2 * 5/2008 Tokhtuev .............. G01J 3/0264 250/356.1
7,616,845 B2 * 11/2009 Matsuoka ............ G02B 6/4246 385/33
8,025,444 B2 * 9/2011 Choi ........................ G02B 6/42 385/88

(Continued)

FOREIGN PATENT DOCUMENTS

CN 208737057 U 4/2019
CN 209373186 U 9/2019

(Continued)

*Primary Examiner* — Kaveh C Kianni
(74) *Attorney, Agent, or Firm* — Slater Matsil, LLP

(57) ABSTRACT

Embodiments include transistor-outline packages, methods, optical sub-assemblies, and optical modules associated therewith. In some embodiments a transistor-outline package includes a transistor base, a transistor cap, a first lens, a light filtering assembly, a lens assembly, a first optical receiving chip, and a second optical receiving chip. The transistor base and the transistor cap are fastened to form an accommodation cavity. The first lens is disposed on the transistor cap, and the first optical receiving chip and second optical receiving chip are disposed on the transistor base. The lens assembly includes a second lens and a third lens. The light filtering assembly is disposed between the first lens and the lens assembly. The transistor-outline package receives and collimates a first light ray by using the first lens on the transistor cap, and the light filtering assembly splits the first light ray into a second light ray and a third light ray.

17 Claims, 7 Drawing Sheets

(56) References Cited

U.S. PATENT DOCUMENTS

| | | | | |
|---|---|---|---|---|
| 8,540,437 | B2 * | 9/2013 | Lee | G02B 6/4215 385/47 |
| 9,164,247 | B2 * | 10/2015 | Amit | G02B 6/4201 |
| 9,213,156 | B2 * | 12/2015 | Amit | G02B 6/4246 |
| 9,417,408 | B2 * | 8/2016 | Kadar-Kallen | G02B 6/4204 |
| 10,241,286 | B2 * | 3/2019 | Jung | H04B 10/25 |
| 10,459,174 | B2 * | 10/2019 | Mathai | G02B 6/4214 |
| 2003/0152336 | A1 * | 8/2003 | Gurevich | G02B 6/4246 385/88 |
| 2006/0198404 | A1 * | 9/2006 | Henrichs | H01S 5/18391 372/100 |
| 2010/0253769 | A1 * | 10/2010 | Coppeta | G02B 27/286 353/7 |
| 2014/0061451 | A1 * | 3/2014 | Park | G02B 6/4246 250/227.11 |
| 2021/0149129 | A1 * | 5/2021 | Wei | H04B 10/25 |
| 2023/0228955 | A1 * | 7/2023 | Zhang | G02B 6/4215 385/93 |
| 2024/0418948 | A1 * | 12/2024 | Yu | G02B 6/4215 |

FOREIGN PATENT DOCUMENTS

| | | | | |
|---|---|---|---|---|
| JP | 2006184759 | A | * | 7/2006 |
| WO | 2019129158 | A1 | | 7/2019 |

* cited by examiner

TRANSISTOR-OUTLINE PACKAGE AND PREPARATION METHOD THEREOF, OPTICAL SUB-ASSEMBLY, OPTICAL MODULE, AND OPTICAL NETWORK SYSTEM

CROSS-REFERENCE TO RELATED APPLICATIONS

This application is a continuation of International Application No. PCT/CN2021/125365, filed on Oct. 21, 2021, the disclosure of which is hereby incorporated by reference in its entirety.

TECHNICAL FIELD

This application relates to the field of optical sub-assembly technologies, and in particular, to a transistor-outline package and a preparation method thereof, an optical sub-assembly, an optical module, and an optical network system.

BACKGROUND

An optical sub-assembly is an important component of an optical module. A package type of the optical sub-assembly mainly includes several forms such as a coaxial package, a box package, a chip-on-board (COB) package. A transistor-outline (TO) package is a basic package structure of a coaxial-type optical sub-assembly. A conventional TO package includes a transmitting type and a receiving type. One TO package usually has only one laser diode (LD) chip or photo diode (PD) chip, and can only receive or send a single-channel/single-wavelength signal. However, based on different functions, quantities, and assembly structures of TO packages integrated in the coaxial-type optical sub-assembly, a conventional coaxial-type optical sub-assembly is mainly classified into types such as a single-fiber unidirectional optical sub-assembly, a single-fiber bi-directional optical sub-assembly (BOSA), and a single-fiber triplexer or single-fiber quadruplexer optical sub-assembly that integrates more TO packages at a transmit/receive end. The single-fiber unidirectional optical sub-assembly may include a transmitter optical sub-assembly (TOSA) or a receiver optical sub-assembly (ROSA). Because a package of the coaxial-type optical sub-assembly is simple and costs are low, the coaxial-type optical sub-assembly is widely applied in optical sub-assembly products in fields such as passive optical network (PON), wireless network, and internet protocol (IP).

In a conventional technology, to implement signal transmission of a large quantity of channels, the optical sub-assembly needs to integrate a large quantity of TO packages. Limited by a size of a conventional TO package and a capability and design of a lens, the optical sub-assembly needs to increase a package size of the sub-assembly, and use a complex optical path solution such as parallel light and a relay lens together with more elements such as an external lens and a light filter. As a result, difficulty of designing and manufacturing an overall structure of the optical sub-assembly increase. Consequently, material costs and production costs are high, and it is difficult to meet a requirement of a miniaturized module package protocol.

SUMMARY

This application provides a transistor-outline package and a preparation method thereof, an optical sub-assembly, an optical module, and an optical network system, to reduce a volume of the optical sub-assembly and reduce costs of the optical sub-assembly.

According to a first aspect, this application provides a transistor-outline package. The transistor-outline package includes a transistor base, a transistor cap, a first lens, a light filtering assembly, a lens assembly, a first optical receiving chip, and a second optical receiving chip. The transistor cap is disposed on a first side surface of the transistor base, so that the transistor base and the transistor cap are fastened to form an accommodation cavity. The first lens is disposed on the top of the transistor cap and penetrates the transistor cap. The first lens is configured to receive a first light ray emitted to the transistor-outline package, and collimate the first light ray. Specifically, the first light ray is transmitted through an optical fiber. The light filtering assembly, the lens assembly, the first optical receiving chip, and the second optical receiving chip are disposed in the accommodation cavity. Specifically, the first optical receiving chip and the second optical receiving chip are disposed on the first side surface of the transistor base, and are connected to a pin on the transistor base. The lens assembly includes a second lens and a third lens. The second lens is disposed on a side that is of the first optical receiving chip and that is away from the transistor base, and the third lens is disposed on a side that is of the second optical receiving chip and that is away from the transistor base. The light filtering assembly is disposed on a side that is of the lens assembly and that is away from the first optical receiving chip and the second optical receiving chip. In this solution, the transistor-outline package receives the first light ray by using the first lens on the transistor cap, and the first lens receives the first light ray and collimates the first light ray. Then the first light ray is emitted to the light filtering assembly, and the light filtering assembly splits the first light ray into a second light ray and a third light ray. A wavelength of the second light ray corresponds to an operating wavelength of the first optical receiving chip, and a wavelength of the third light ray corresponds to an operating wavelength of the second optical receiving chip. The lens assembly is located between the light filtering assembly and both the first optical receiving chip and the second optical receiving chip. The second lens of the lens assembly receives the second light ray and converges the second light ray, so that the second light ray is converged to a photosensitive surface of the first optical receiving chip. The third lens receives the third light ray and converges the third light ray, so that the third light ray is converged to a photosensitive surface of the second optical receiving chip.

In this solution, at least two optical signals with different wavelengths are separated and transmitted inside the transistor-outline package, and at least dual receiving in one transistor-outline package can be implemented in the transistor-outline package. In this solution, dimension reduction of packaging is performed at a device level, so that a single transistor-outline package can implement at least the dual receiving in one transistor-outline package. When an optical sub-assembly is used in a multi-channel transceiving and transmission scenario, a quantity of transistor-outline packages that needs to be integrated can be reduced, so that a structure of the optical sub-assembly is simpler, a manufacturing process is less difficult, costs are lower, and miniaturized packaging can be implemented.

When the lens assembly is specifically disposed, the second lens and the third lens may be of an integrated structure. In this solution, a quantity of accessories of the transistor-outline package can be reduced, to facilitate manufacturing and assembly of the lens assembly.

In addition, the lens assembly may further include a fastening part, and the fastening part, the second lens and the third lens are of an integrated structure. If the fastening part is mounted on the transistor base, the second lens and the third lens are also equivalently mounted on the transistor base through the fastening part. In addition, the light filtering assembly may also be mounted on the transistor base. In this case, the lens assembly in this solution may not only serve as a lens, but also serve as a support. In this solution, an optical element for optical path integration in the transistor-outline package is simplified, and internally packaging an optical element for multi-channel optical path integration in a small space by an optical sub-assembly having the transistor-outline package is simplified.

In a specific technical solution, the lens assembly is a plastic lens assembly. This solution tends to use a lens assembly one-time formed by using an injection molding process, which is small in weight and low in costs.

In this application, the first lens may be directly disposed on the transistor cap, and the first lens may be specifically a hemispherical lens. Costs of the hemispherical lens are low, to help reduce costs of the transistor-outline package.

When the light filtering assembly is specifically disposed, the light filtering assembly may include a first light filter, a second light filter, and a third light filter. The first light filter is opposite to the second lens, and is configured to transmit the second light ray and reflect a light ray other than the second light ray, so that the first optical receiving chip can receive the second light ray with a corresponding wavelength. The second light filter is disposed between the first light filter and the third light filter, and is configured to reflect the light ray reflected by the first filter to the third filter. The third filter is opposite to the third lens, and is configured to transmit the third light ray, so that the second optical receiving chip can receive the third light ray with a corresponding wavelength.

According to a second aspect, this application further provides a method for preparing a transistor-outline package. The method includes the following steps: performing die bonding and wire bonding on a first optical receiving chip and a second optical receiving chip on a first side surface of a transistor base by using a silver adhesive passive die bonding and gold wire bonding process; attaching a lens assembly to the first side surface of the transistor base by using the passive die bonding process, where the lens assembly includes a second lens and a third lens, the second lens receives a second light ray and converges the second light ray to the first optical receiving chip, and the third lens receives a third light ray and converges the third light ray to the second optical receiving chip; attaching a light filtering assembly to a fastening part of the lens assembly by using a passive adhesive curing process, where the light filtering assembly splits a first light ray into the second light ray and the third light ray; and welding a transistor cap having a first lens to the transistor base, where the first lens receives and collimates the first light ray. In this solution, the transistor-outline package in the first aspect can be prepared by using a conventional process and device. When a volume of the optical sub-assembly is reduced and costs are reduced, process costs of the transistor-outline package are not increased.

According to a third aspect, this application further provides an optical sub-assembly. The optical sub-assembly includes a transistor body and at least one transistor-outline package in any one of the foregoing embodiments. The transistor body has a transistor wall and an inner cavity. The inner cavity is configured to transmit a light ray, and the light ray includes a light ray received by the optical sub-assembly and a light ray emitted by the optical sub-assembly. The transistor-outline package is mounted on the transistor wall of the transistor body, and the first lens of the transistor-outline package is disposed toward the inner cavity, so that the first lens can receive the first light ray transmitted in the inner cavity. In this solution, dimension reduction of packaging is performed at a device level, so that a single transistor-outline package can implement at least dual receiving in one transistor-outline package. When a coaxial-type optical sub-assembly is used in a multi-channel transceiving and transmission scenario, a quantity of transistor-outline packages that needs to be integrated can be reduced, so that a structure of the optical sub-assembly is simpler, a manufacturing process is less difficult, costs are lower, and miniaturized packaging can be implemented.

In a specific technical solution, the optical sub-assembly may further include an adapter. The adapter is mounted on the transistor body, and the adapter may also have a cavity, where the cavity is connected to the inner cavity of the transistor body. The adapter may be configured to connect an optical fiber, so that the optical fiber is connected to the inner cavity, and the light ray can be transmitted between the inner cavity and the optical fiber.

According to a fourth aspect, this application further provides an optical module. The optical module includes a housing and the foregoing optical sub-assembly. The foregoing optical sub-assembly is mounted on the housing. In a specific embodiment, the housing has an optical fiber interface. The optical fiber interface is opposite to the adapter, and the optical fiber interface is configured to mount the optical fiber. The optical fiber is connected to the adapter through the optical fiber interface in sequence, so that the optical fiber is connected to the inner cavity of the optical sub-assembly. The foregoing optical fiber is connected to the adapter through the optical fiber interface, to transmit an optical signal. This solution helps reduce a volume of the optical module, implement miniaturization of the optical module, and also reduce costs of the optical module.

According to a fifth aspect, this application further provides an optical network system. The optical network system includes an optical line terminal (OLT) and an optical network unit (ONU). The optical line terminal is connected to the optical network unit by using a passive optical distribution network. The optical line terminal includes an optical sub-assembly, or the optical network unit includes the optical sub-assembly. The optical sub-assembly is a basis for normal communication of an entire network. The optical sub-assembly in this solution has a small volume and low costs, to help reduce costs of the optical network system.

REFERENCE NUMERALS

Figure 1:
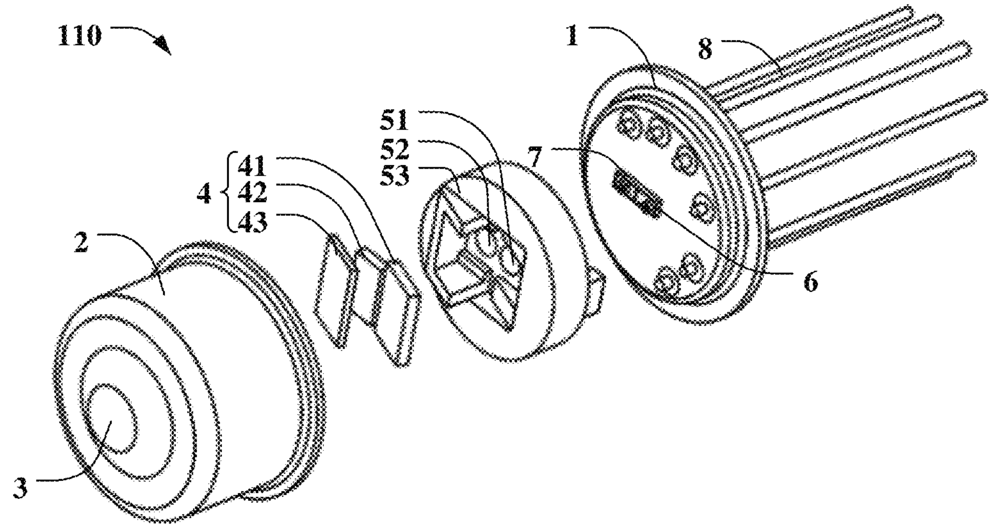
FIG. 1 is a schematic exploded view of a structure of a transistor-outline package according to an embodiment of this application.

1—transistor base; 2—transistor cap;
3—first lens; 4—light filtering assembly;
41—first light filter; 42—second light filter;
43—third light filter; 5—lens assembly;
51—second lens; 52—third lens;
53—fastening part; 6—first optical receiving chip;
7—second optical receiving chip; 8—pin;
01—first light ray; 011—second light ray;
012—third light ray; 100—optical sub-assembly;
110—transistor-outline package; 120—transistor body;
130—adapter; 140—first transistor-outline package;
150—second transistor-outline package; 160—third transistor-outline package;
170—fourth transistor-outline package; 200—optical line terminal;
300—optical network unit; 400—passive optical distribution network.

DETAILED DESCRIPTION OF ILLUSTRATIVE EMBODIMENTS

To facilitate understanding of a transistor-outline package and a preparation method thereof, an optical sub-assembly, an optical module, and an optical network system that are provided in embodiments of this application, the following describes an application scenario thereof. With development of technologies, application of implementing signal transmission by using an optical signal is increasingly wide. For example, an optical module product is applied in fields such as a passive optical network (PON), a wireless network, and an internet protocol (IP). The optical module generally includes the optical sub-assembly, and the optical sub-assembly further includes a package structure. For example, a currently widely used package structure with low costs is a transistor-outline package (which may be specifically a coaxial-type package). An optical receiving chip or an optical transmitting chip and an original part such as a lens assembly are packaged into an integrated structure to form the transistor-outline (TO) package, so as to facilitate preparation and formation of the optical sub-assembly. In a conventional technology, a transistor-outline package usually implements packaging of only one chip, in other words, the transistor-outline package can transmit only one optical transmitting signal or transmit only one optical receiving signal. Currently, the optical sub-assembly needs to have a multi-direction transmission function, to reduce a volume of the optical module and enrich functions of the optical module. In the conventional technology, to implement the multi-direction transmission function of the optical sub-assembly, a plurality of transistor-outline packages need to be mounted on the optical sub-assembly. As a result, an optical path design of the optical sub-assembly is complex and manufacturing difficulty is increased. In addition to high costs, the increasing in difficulty also causes a large total volume of the optical sub-assembly. Therefore, this application provides a transistor-outline package that can implement dual receiving in one transistor-outline package and a preparation method thereof, an optical sub-assembly having the foregoing transistor-outline package, an optical module, and an optical network system. The following describes embodiments of this application in detail with reference to the accompanying drawings.

Terms used in the following embodiments are merely intended to describe specific embodiments, but are not intended to limit this application. The terms "one", "a", and "this" of singular forms used in this specification and the appended claims of this application are also intended to include expressions such as "one or more", unless otherwise specified in the context clearly.

Reference to "an embodiment", "specific embodiment", or the like described in this specification indicates that one or more embodiments of this application include a specific feature, structure, or characteristic described with reference to the embodiment. The terms "include", "have", and their variants all mean "include but are not limited to", unless otherwise specifically emphasized in another manner.

Figure 2:
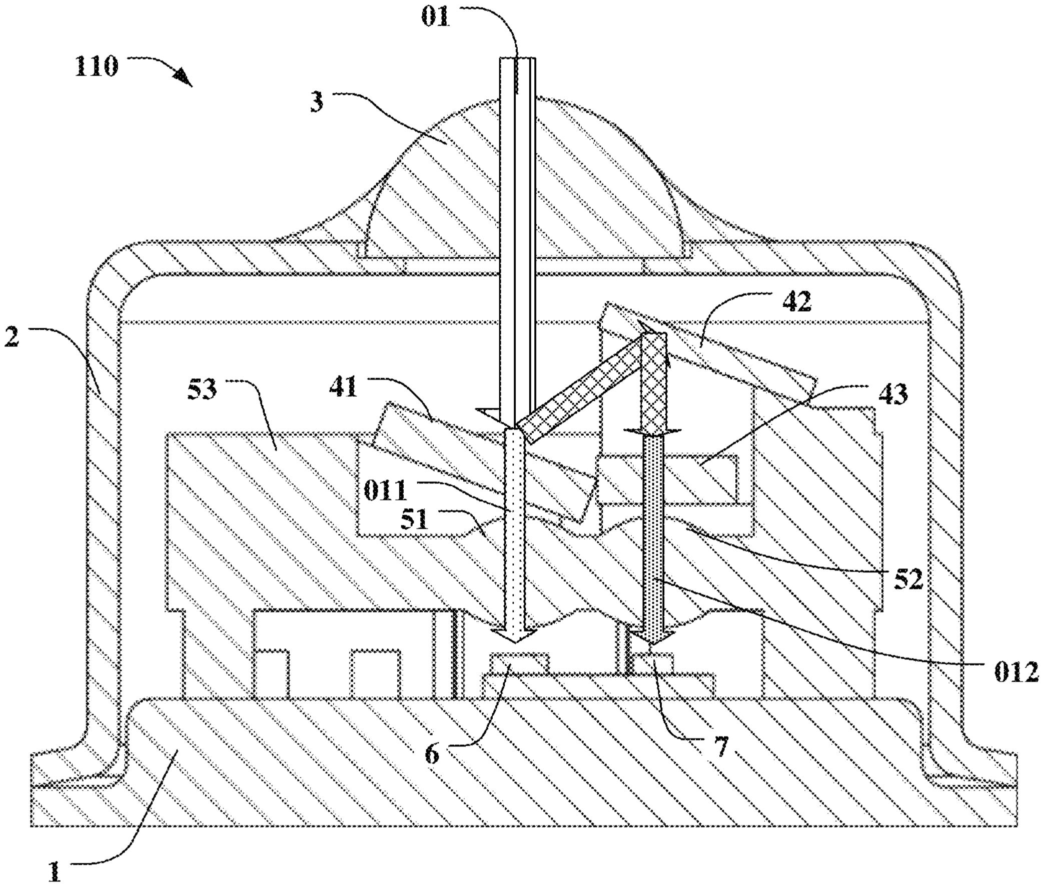
FIG. 2 is a schematic sectional view of a structure of a transistor-outline package according to an embodiment of this application.

FIG. 1 is a schematic exploded view of a structure of a transistor-outline package according to an embodiment of this application. FIG. 2 is a schematic sectional view of the structure of the transistor-outline package according to an embodiment of this application. As shown in FIG. 1 and FIG. 2, a transistor-outline (TO) package 110 in this embodiment of this application includes a transistor base 1, a transistor cap 2, a first lens 3, a light filtering assembly 4, a lens assembly 5, a first optical receiving chip 6, and a second optical receiving chip 7. The transistor base 1 serves as a bearing mechanical part of the transistor-outline package 110. The first optical receiving chip 6 and the second optical receiving chip 7 are disposed on a first side surface of the transistor base 1, and are fastened to a pin 8. The pin 8 is connected to the first optical receiving chip 6 and the second optical receiving chip 7, and is configured to transmit a signal of the transistor-outline package 110. The first lens 3 is disposed on the top of the transistor cap 2 and penetrates the transistor cap 2, and is configured to transmit a first light ray 01 emitted to the transistor-outline package 110. The first light ray 01 may be specifically a light ray transmitted by an optical fiber. Specifically, the transistor cap 2 is mounted on the first side surface of the transistor base 1, the transistor cap 2 and the transistor base 1 form an accommodation cavity. The light filtering assembly 4, the lens assembly 5, the first optical receiving chip 6, and the second optical receiving chip 7 are disposed in the accommodation cavity. Specifically, the light filtering assembly 4 is located on a side that is of the first lens 3 and that faces the transistor base 1, in other words, a side that is of the first lens 3 and that faces the first optical receiving chip 6 and the second optical receiving chip 7. The first light ray 01 emitted from the first lens 3 is emitted to the light filtering assembly 4 for light splitting. In this case, the light filtering assembly 4 may split the first light ray 01 into a second light ray 011 and a third light ray 012. Specifically, light splitting may be performed based on different wavelengths of the second light ray 011 and the third light ray 012. The lens assembly 5 is located on a side that is of the light filtering assembly 4 and that is away from the first lens 3, and is configured to receive the second light ray 011 and the third light ray 012 that are formed through light splitting by the light filtering assembly 4. The lens assembly 5 includes a second lens 51 and a third lens 52. The second lens 51 receives the second light ray 011, and the third lens 52 receives the third light ray 012. The first optical receiving chip 6 is located on a side that is of the second lens 51 and that is away from the light filtering assembly 4. The second lens 51 is configured to collimate the second light ray 011, so that the second light ray 011 is emitted to the first optical receiving chip 6. Similarly, the second optical receiving chip 7 is located on a side that is of the third lens 52 and that is away from the light filtering assembly 4. The third lens 52 is configured to collimate the third light ray 012, so that the third light ray 012 is emitted to the second optical receiving chip 7.

Figure 3:
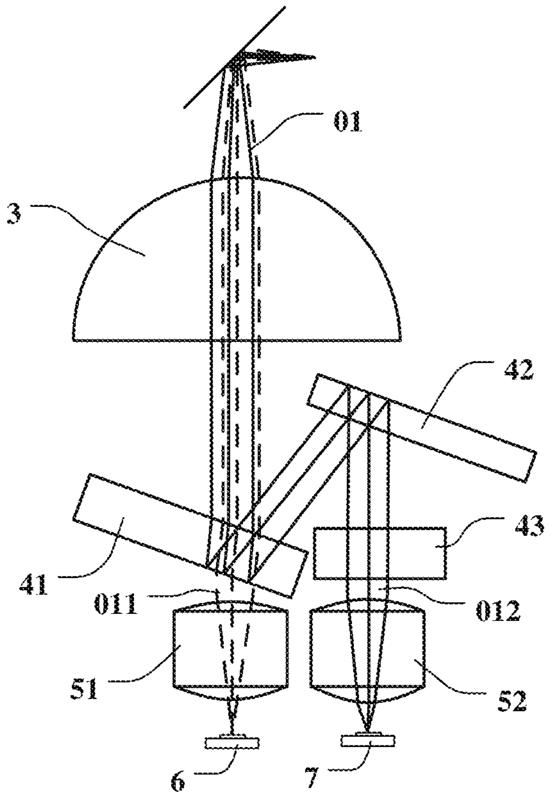
FIG. 3 is a diagram of an optical path of a transistor-outline package according to an embodiment of this application.

FIG. 3 is a diagram of an optical path of the transistor-outline package according to an embodiment of this application. With reference to FIG. 2 and FIG. 3, in this technical solution of this application, the first lens 3 on the transistor cap 2 of the transistor-outline package 110 directly receives the first light ray 01 transmitted by a single-mode optical fiber, collimates the first light ray 01, and then emits the first light ray 01 into the accommodation cavity. Then, the light filtering assembly 4 is used to perform light splitting. Specifically, the first light ray 01 may be split into the second light ray 011 and the third light ray 012 based on different wavelengths of light rays. In other words, a wavelength of the second light ray 011 is different from a wavelength of the third light ray 012. Specifically, the wavelength of the second light ray 011 corresponds to an operating wavelength of the first optical receiving chip 6, and the wavelength of the third light ray 012 corresponds to an operating wavelength of the second optical receiving chip 7. The second light ray 011 and the third light ray 012 are optical signals. In this solution, the two optical signals with different wavelengths are separated and transmitted inside the transistor-outline package 110. Finally, the two light rays are converged to a corresponding photosensitive surface of the first optical receiving chip 6 and a corresponding photosensitive surface of the second optical receiving chip 7 respectively through the second lens 51 and the third lens 52 in the lens assembly 5, to implement receiving of the optical signals through wavelength division multiplexing (WDM). The transistor-outline package 110 in this technical solution of this application has the first optical receiving chip 6 and the second optical receiving chip 7. The first optical receiving chip 6 and the second optical receiving chip 7 each can receive a light ray, and at least dual receiving in one transistor-outline package can be implemented in the transistor-outline package 110.

In a conventional technical solution, an optical sub-assembly needs to integrate a plurality of transistor-outline packages having a single receiving or single transmitting function, to implement transceiving and transmission of multi-channel optical signals. A quantity of transistor-outline packages is large, a complex design of an optical path related to light splitting, wavelength multiplexing, and coupling is required, the design is difficult, the quantity of elements is large, and a volume of the optical sub-assembly is large. In addition, requirements for process precision and device are high, and there are problems of a large quantity of working procedures and low production efficiency. In this solution, dimension reduction of packaging is performed at a device level, so that a single transistor-outline package 110 can implement at least the dual receiving in one transistor-outline package. When the optical sub-assembly is used in a multi-channel transceiving and transmission scenario, the quantity of transistor-outline packages that needs to be integrated can be reduced, so that a structure of the optical sub-assembly is simpler, a manufacturing process is less difficult, costs are lower, and miniaturized packaging can be implemented.

In this embodiment of this application, the light filtering assembly 4 is used inside the transistor-outline package 110 to perform light splitting, to simplify a complex design of performing multi-wavelength light splitting by the optical sub-assembly in the transistor-outline, reduce space of the optical sub-assembly, and reduce quantities of external lenses and external light filters of the optical sub-assembly. In addition, in this technical solution of this application, in comparison with a wavelength multiplexing element and a wavelength demultiplexing element such as an optical demultiplexer (ODeMUX), a polarization beam splitter (PBS), or a rhomboid prism beam splitter (Block) that are used in a built-in light filter in the transistor-outline of the optical sub-assembly, a conventional light filter disposed inside the transistor-outline package 110 is simpler, and has a smaller volume and lower costs. After a quantity of receiving transistor-outline packages included in the optical sub-assembly is reduced by using a technology of the dual receiving in one transistor-outline package, the volume of the optical sub-assembly is small, and an optical distance of light ray propagation in the optical sub-assembly may be reduced. Therefore, all transistor-outline packages may use a design of a lens transistor cap. In comparison with a conventional optical path solution of parallel light or a relay lens group, many external collimating lenses or relay lenses are saved, and a packaging size of the sub-assembly is reduced. In addition, an optical path of a transistor-outline package at each end is independently coupled, so that a coupling process is simpler. In this solution, a plurality of times of die bonding, adhering, and coupling processes are reduced at the device level, overall processing difficulty is reduced, and the production efficiency is improved.

Continue to refer to FIG. 2 and FIG. 3. In a specific technical solution, the light filtering assembly 4 includes three light filters: a first light filter 41, a second light filter 42, and a third light filter 43. The first light filter 41 is opposite to the second lens 51, and is configured to transmit the second light ray 011 and reflect a light ray other than the second light ray 011. The wavelength of the second light ray 011 is the wavelength corresponding to the first optical receiving chip 6, so that the first optical receiving chip 6 can receive the second light ray 011. The second light filter 42 is located between the first light filter 41 and the third light filter 43. The second light filter 42 may be specifically a total reflection light filter, and is configured to reflect, to the third light filter 43, a light ray reflected by the first light filter 41 to the second light filter 42. The third light filter 43 is opposite to the second light filter 42, and is configured to transmit the third light ray 012. The wavelength of the third light ray 012 is the wavelength corresponding to the second optical receiving chip 7, so that the second optical receiving chip 7 can receive the third light ray 012. Specifically, the wavelength of the second light ray 011 is less than the wavelength of the third light ray 012, so that the first light ray 01 is easily split into the second light ray 011 and the third light ray 012.

Figure 4:
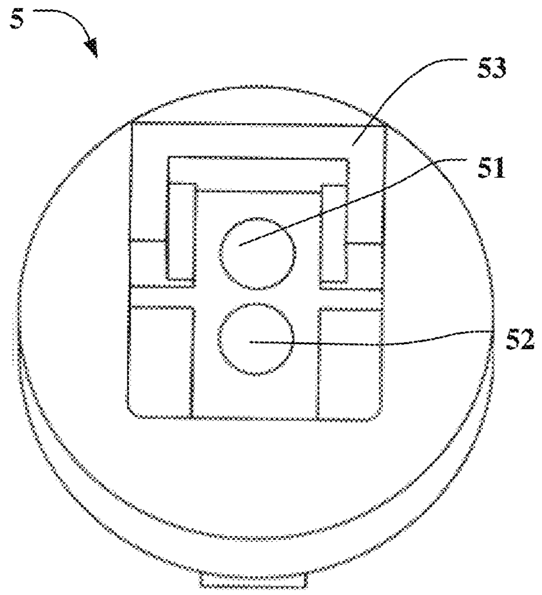
FIG. 4 is a schematic diagram of a structure of a lens assembly according to an embodiment of this application.

FIG. 4 is a schematic diagram of a structure of a lens assembly according to an embodiment of this application. As shown in FIG. 4, when the lens assembly 5 is specifically prepared, the second lens 51 and the third lens 52 may be of an integrated structure. In this solution, the lens assembly 5 is made into the integrated structure, to reduce a quantity of accessories of the transistor-outline package 110, so as to facilitate manufacturing and assembly of the lens assembly 5.

Still referring to FIG. 4, the lens assembly 5 may further include a fastening part 53, and the fastening part 53, the second lens 51 and the third lens 52 are of an integrated structure. It should be noted that, the second lens 51, the third lens 52, and the fastening part 53 may be fastened as the integrated structure in an assembly manner, or the second lens 51, the third lens 52, and the fastening part 53 may be prepared and formed by using a one-time forming process. With reference to FIG. 2, the fastening part 53 is mounted on the transistor base 1, and the light filtering assembly 4 is mounted on the fastening part 53. In this solution, the lens assembly 5 may serve as a core component for optical path integration inside the transistor-outline package 110, may also converge the second light ray 011 and the third light ray 012, and may further serve as a support for the second lens 51, the third lens 52, and the light filtering assembly 4, so that the lens assembly 5 and the light filtering assembly 4 are mounted on the transistor base 1. In this solution, an optical element for the optical path integration in the transistor-outline package 110 is simplified, and internally packaging an optical element for multi-channel optical path integration in a small space by an optical sub-assembly having the transistor-outline package 110 is simplified.

When the lens assembly 5 is specifically prepared, the lens assembly 5 may be specifically a plastic lens assembly, in other words, the lens assembly 5 is prepared by using plastic. In a conventional technology, the lens, the support for the light filtering assembly 4, and the like are usually made of glass and a metal material. In this technical solution of this application, preparing the lens assembly 5 by using plastic has advantages such as low costs, a small weight, and easy molding. A structural detail of the lens assembly 5 may be flexibly designed based on a requirement, so that the lens assembly 5 is easily mounted and fastened, and the second lens 51 and the third lens 52 have a proper refractive index. In this solution, a process of injection molding processing by a mold may be used to form the foregoing structures such as the first lens, the second lens, and the fastening part 53 at one time. Processing precision is high, consistency is good, the process is simple, and this solution is suitable for mass processing and production. The lens assembly 5 in this solution has low costs and good performance.

Still referring to FIG. 1 and FIG. 2, in this technical solution of this application, the first lens 3 is directly disposed on the transistor cap 2, and the first lens 3 may be specifically a hemispherical lens. The hemispherical lens is a conventional lens, and the hemispherical lens receives the first light ray 01 of the optical fiber and collimates the first light ray 01. Costs of the hemispherical lens are low, to help reduce costs of the transistor-outline package 110.

Figure 5:
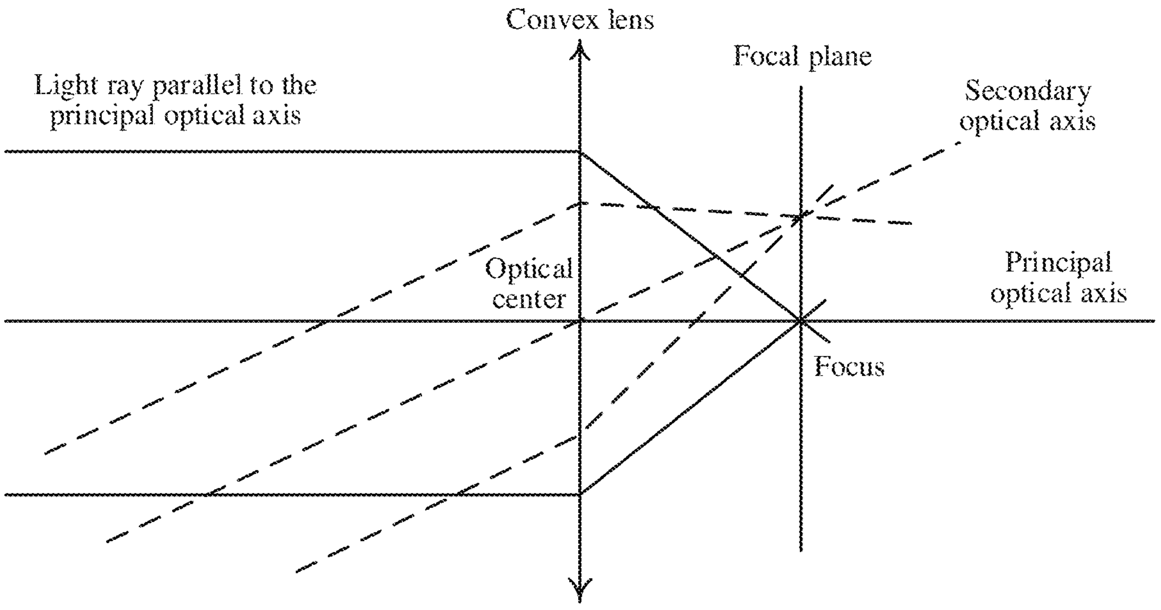
FIG. 5 is a diagram of a principle of convex lens imaging.
Figure 6:
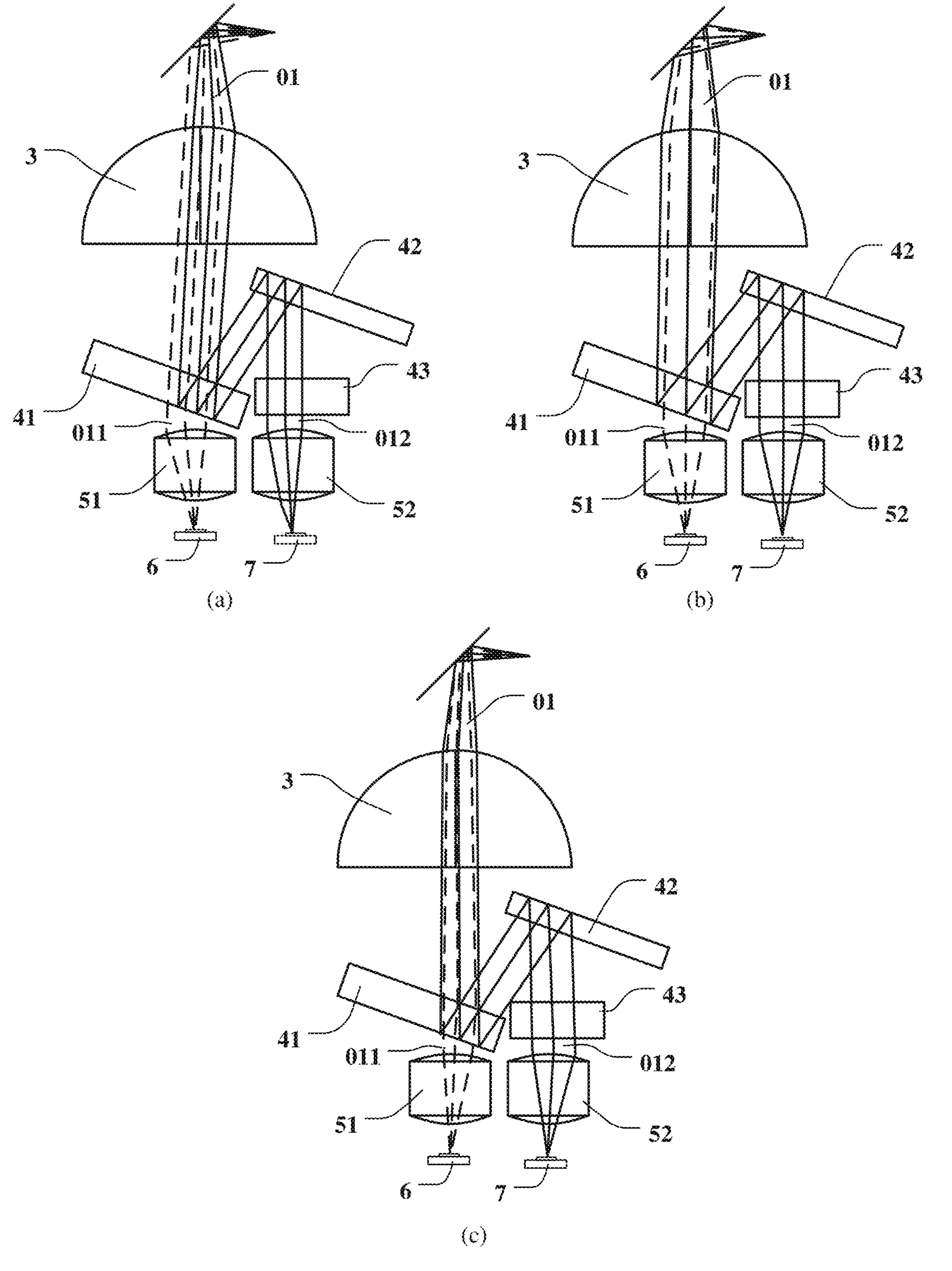
FIG. 6 is a schematic diagram of a position relationship between a transistor-outline package and an optical fiber according to an embodiment of this application.

FIG. 5 is a diagram of a principle of convex lens imaging. FIG. 6 is a schematic diagram of a position relationship between the transistor-outline package and the optical fiber according to an embodiment of this application. As shown in FIG. 5 and FIG. 6, a direction of a light ray emitted to the light filtering assembly 4 may be adjusted by adjusting a position relationship between the first lens 3 and the optical fiber, so that the light rays emitted to the first optical receiving chip 6 and the second optical receiving chip 7 can be accurately emitted to the photosensitive surfaces. The first lens 3 serves as a collimating lens and is integrated with the transistor cap 2 to form a lens transistor cap. The first lens 3 may move with the transistor-outline package 110 as a whole, to ensure a transmission direction of parallel light inside the transistor-outline package 110. Then, the parallel light converges through the lens assembly 5, so that a final light ray convergence position may be adjusted, to correct and compensate for a deviation of the lens assembly 5 relative to the first optical receiving chip 6 and the second optical receiving chip 7. For example, as shown in (a) in FIG. 6, when the first optical receiving chip 6 and the second optical receiving chip 7 are located at a position rightward below the lens assembly 5, the first optical receiving chip 6 and the second optical receiving chip 7 can receive the light ray in a state shown in (a) in FIG. 6. As shown in (b) in FIG. 6, when the first optical receiving chip 6 and the second optical receiving chip 7 are located at a position right below the lens assembly 5, the first optical receiving chip 6 and the second optical receiving chip 7 can receive the light ray in a state shown in (b) in FIG. 6. As shown in (c) in FIG. 6, when the first optical receiving chip 6 and the second optical receiving chip 7 are located at a position leftward below the lens assembly 5, the first optical receiving chip 6 and the second optical receiving chip 7 can receive the light ray in a state shown in (c) in FIG. 6. Therefore, even if there is a deviation between components during manufacturing, it can be ensured that the optical signal can be received by the first optical receiving chip 6 and the second optical receiving chip 7. In this solution, optical path coupling of dual receiving in one transistor-outline package has a larger process tolerance in die bonding precision of the transistor cap 2 of the transistor-outline package 110, the first optical receiving chip 6, and the second optical receiving chip 7, and a requirement for a device capability is consistent with that of a conventional transistor-outline package, so that costs are reduced. In addition, no active process needs to be used in an entire process of processing the transistor-outline package 110, so that the production efficiency is greatly improved.

When the transistor-outline package 110 in the foregoing embodiment is designed, a main structure and an optical path solution of the optical sub-assembly having the dual-receiving-in-one transistor-outline package 110 may be first determined based on a requirement of an optical module on a specification and a packaging size of the optical sub-assembly. Then a design requirement for a packaging size and a coupling focal length of the dual-receiving-in-one transistor-outline package 110 is decomposed. A high-density layout design solution of the transistor base 1, the first optical receiving chip 6, and the second optical receiving chip 7 of the dual-receiving-in-one transistor-outline package 110 is determined based on a preparation requirement of two single-receiving transistor-outline packages that need to be integrated. The preparation requirement of the single-receiving transistor-outline package may specifically include an operating wavelength, a transmission rate, a quantity of function pins, a quantity and specifications of wafers such as chips, a solution of die bonding and wire bonding, and the like. Then, optical path designs of light splitting and coupling of the two received light rays in the dual-receiving-in-one transistor-outline package are determined, to design the lens assembly 5 and the light filtering assembly 4. Then, the dual-receiving-in-one transistor-outline package 110 is prepared.

Figure 7:
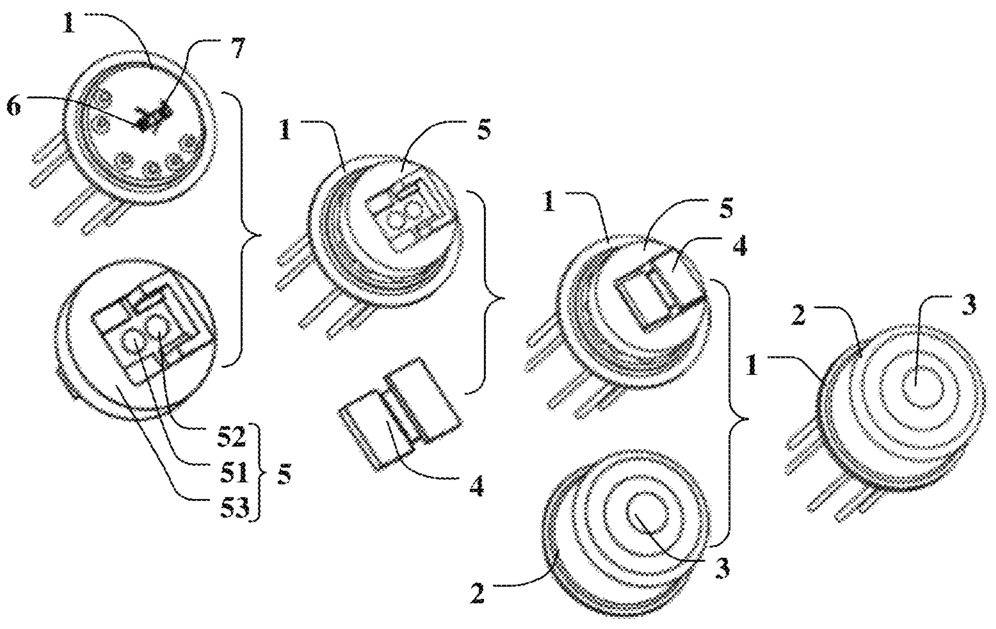
FIG. 7 is a schematic diagram of a structure of a preparation process of a transistor-outline package according to an embodiment of this application.

Therefore, based on a same inventive concept, this application further provides a method for preparing the dual-receiving-in-one transistor-outline package 110 in the foregoing embodiment. FIG. 7 is a schematic diagram of a structure of a preparation process of the transistor-outline package according to an embodiment of this application.

Figure 8:
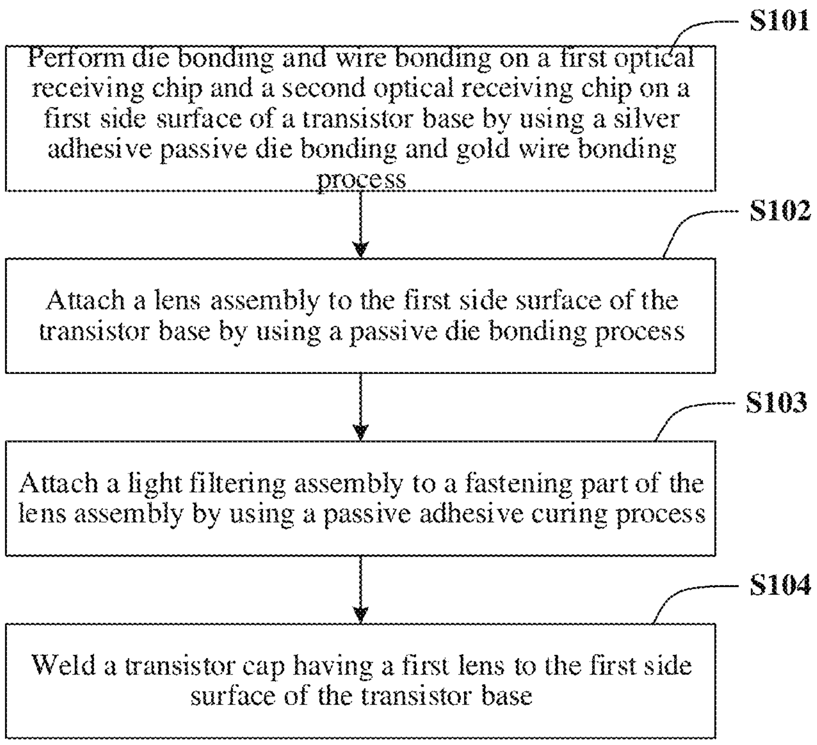
FIG. 8 is a schematic diagram of a preparation process of a transistor-outline package according to an embodiment of this application.

FIG. 8 is a schematic diagram of a preparation process of the transistor-outline package according to an embodiment of this application. As shown in FIG. 7 and FIG. 8, the method specifically includes the following steps.

Step S101: Perform die bonding and wire bonding on the first optical receiving chip 6 and the second optical receiving chip 7 on the first side surface of the transistor base 1 by using a silver adhesive passive die bonding and gold wire bonding process.

In this step, the first optical receiving chip 6, the second optical receiving chip 7, and another functional wafer may be arranged and mounted on the transistor base 1 of the transistor-outline package based on designed positions by using an automatic die bonding machine, and then the die bonding is completed by using silver adhesive bonding, baking, and curing. Then, bonding of functional leads among the first optical receiving chip 6, the second optical receiving chip 7, the other functional wafers, the transistor base 1, and the pin 8 of the transistor-outline package 110 is completed by using an automatic wire welding machine.

Step S102: Attach the lens assembly 5 to the first side surface of the transistor base 1 by using a passive die bonding process.

In this step, the lens assembly 5 may be mounted by using a charge-coupled device (CCD) camera of the die bonding machine and a passive die bonding method of image template recognition. A circle center of the second lens 51 is aligned with a circle center of the photosensitive surface of the first optical receiving chip 6, and a circle center of the third lens 52 is aligned with a circle center of the photosensitive surface of the second optical receiving chip 7. In addition, the lens assembly 5 is attached by using a process of on-line ultraviolet curing in the die bonding process. Specifically, fast bonding and pre-positioning between the lens assembly 5 and the transistor base 1 may be first completed by using an ultraviolet light for exposure in coordination with an ultraviolet adhesive, and then heat curing enhancement is performed through high-temperature baking.

Step S103: Attach the light filtering assembly 4 to the fastening part 53 of the lens assembly 5 by using a passive adhesive curing process.

Adhesive dispensing is first performed on the fastening part 53 of the lens assembly 5 through conventional adhesive dispensing in coordination with the die bonding process, and epoxy adhesive is usually used for adhesive dispensing. Then, the light filtering assembly 4 is attached to a designed corresponding position of the lens assembly 5, and then heat curing bonding is performed through the high-temperature baking.

Step S104: Weld the transistor cap 2 having the first lens 3 to the first side surface of the transistor base 1.

A conventional resistance welding process and an automatic cap sealing machine are used to perform, through passive mechanical positioning, concentric sealing and welding on the transistor base 1 and the transistor cap 2 having the first lens 3, so as to complete packaging of the dual-receiving-in-one transistor-outline package 110.

In this solution, the transistor-outline package 110 in the foregoing embodiment can be prepared by using a conventional process and device. When a volume of the optical sub-assembly is reduced and costs are reduced, process costs of the transistor-outline package 110 are not increased.

Figure 9:
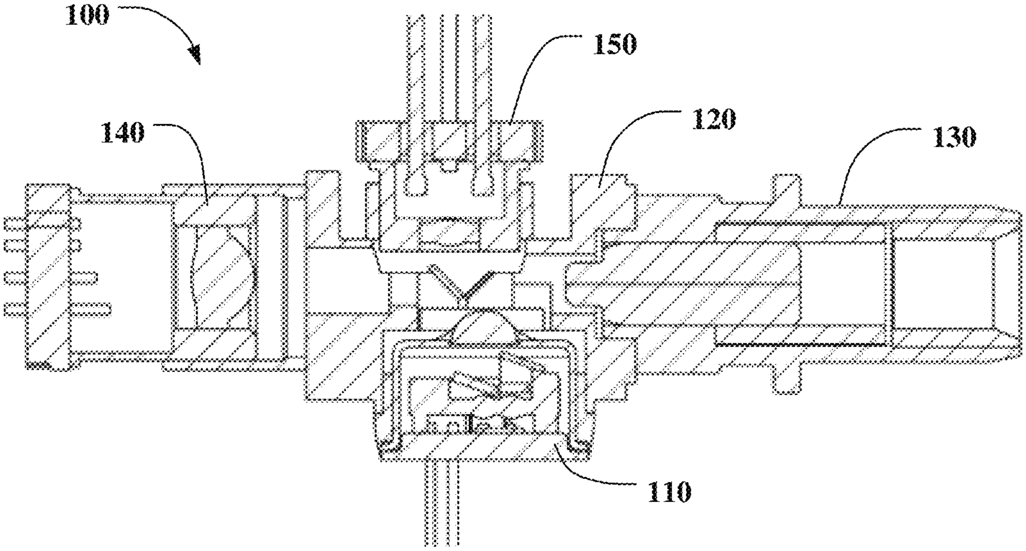
FIG. 9 is a schematic sectional view of a structure of an optical sub-assembly according to an embodiment of this application.

Based on a same inventive concept, this application further provides an optical sub-assembly. FIG. 9 is a schematic sectional view of a structure of an optical sub-assembly according to an embodiment of this application. As shown in FIG. 9, the optical sub-assembly includes a transistor body 120 and at least one transistor-outline package 110 in any one of the foregoing embodiments. The transistor body 120 has a transistor wall and an inner cavity. The transistor-outline package 110 is mounted on the transistor wall of the transistor body 120, and the first lens 3 of the transistor-outline package 110 is disposed toward the inner cavity. The inner cavity of the transistor body 120 is configured to transmit a light ray, in other words, an optical fiber is connected to the inner cavity to transmit the light ray. In this technical solution of this application, dimension reduction of packaging is performed at a device level, so that a single transistor-outline package 110 can implement at least the dual receiving in one transistor-outline package. When the optical sub-assembly is used in a multi-channel transceiving and transmission scenario, a quantity of transistor-outline packages that needs to be integrated can be reduced, so that a structure of the optical sub-assembly is simpler, a manufacturing process is less difficult, costs are lower, and miniaturized packaging can be implemented.

An optical sub-assembly used in a passive optical network (PON) is used as an example. The optical sub-assembly is a core device of an access network optical fiber network system. As a transition product in an evolution phase from a 2.5 G PON (megabit optical fiber broadband) to a 10 G PON (gigabit optical fiber broadband), the optical sub-assembly needs to be compatible with an uplink and a downlink of the 2.5 G PON and the 10 G PON, to implement two transmit two receive, namely, transmission on totally four channels with different wavelengths. In a specific embodiment, transmit wavelengths of the two transmit two receive optical sub-assembly are respectively 1577 nm and 1490 nm, and receive wavelengths are respectively 1270 nm and 1310 nm.

Figure 10:
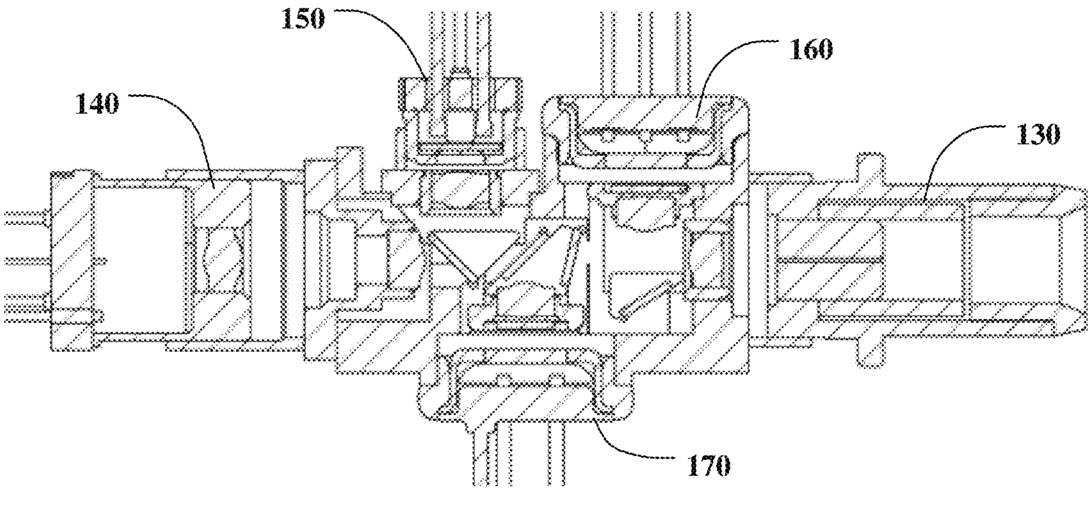
FIG. 10 is a schematic sectional view of an optical sub-assembly in a conventional technical solution.

FIG. 10 is a schematic sectional view of an optical sub-assembly in a conventional technical solution. As shown in FIG. 10, in the conventional technical solution, to implement the foregoing two transmit two receive optical sub-assembly, the optical sub-assembly needs to integrate and package four transistor-outline packages. The four transistor-outline packages are respectively a first transistor-outline package 140, a second transistor-outline package 150, a third transistor-outline package 160, and a fourth transistor-outline package 170. A transmitting chip with a transmitting wavelength of 1577 nm is packaged in the first transistor-outline package 140, a transmitting chip with a transmitting wavelength of 1490 nm is packaged in the second transistor-outline package 150, a receiving chip with a receiving wavelength of 1270 nm is packaged in the third transistor-outline package 160, and a receiving chip with a receiving wavelength of 1310 nm is packaged in the fourth transistor-outline package 170. The first transistor-outline package 140, the second transistor-outline package 150, the third transistor-outline package 160, and the fourth transistor-outline package 170 are packaged and integrated into the transistor body 120 of the optical sub-assembly, to form a single-fiber quadruplexer packaged optical sub-assembly. The optical sub-assembly has a large volume and a long optical distance. In addition, this solution requires a complex design of an optical path related to light splitting, wavelength multiplexing, and coupling, and the design is difficult. Specifically, a plurality of external lenses and light filters are disposed in the transistor body 120, to propagate a light ray. In the embodiment of this application shown in FIG. 9, an optical sub-assembly having a same function need to integrate only three transistor-outline packages. The three transistor-outline packages are respectively a first transistor-outline package 140, a second transistor-outline package 150, and the transistor-outline package 110 in this embodiment of this application. A transmitting chip with a transmitting wavelength of 1577 nm is packaged in the first transistor-outline package 140, a transmitting chip with a transmitting wavelength of 1490 nm is packaged in the second transistor-outline package 150, the first optical receiving chip 6 in the transistor-outline package 110 in this embodiment of this application is a receiving chip with a receiving wavelength of 1270 nm, and the second optical receiving chip 7 is a receiving chip with a receiving wavelength of 1310 nm. The optical sub-assembly in this application may be a dimension-reduced single-fiber triplexer package. In this embodiment, after a quantity of transistor-outline packages in the optical sub-assembly is reduced, the volume of the optical sub-assembly is small, and the optical distance of the light ray propagation in the optical sub-assembly may be reduced. Therefore, all transistor-outline packages may use a design of a lens transistor cap. In comparison with a conventional optical path solution of parallel light or a relay lens group, many external collimating lenses or relay lenses or light filters are saved. In the embodiment shown in FIG. 9, only two external light filters are required in the transistor body 120 of the optical sub-assembly, so that a packaging size of the sub-assembly is further reduced. In addition, an optical path of the transistor-outline package at each end is independently coupled, so that a coupling process is simpler. In this solution, a plurality of times of die bonding, adhering, and coupling processes are reduced at the device level, overall processing difficulty is reduced, and production efficiency is improved.

In a specific technical solution, the optical sub-assembly may further include an adapter 130. The adapter is mounted on the transistor body 120, and the adapter may also have a cavity, where the cavity is connected to the inner cavity of the transistor body 120. The adapter 130 may be configured to connect an optical fiber, so that the optical fiber is connected to the inner cavity, and the light ray can be transmitted between the inner cavity and the optical fiber. Certainly, in another embodiment, the optical sub-assembly may alternatively not have the adapter 130, in other words, the optical sub-assembly may be a pigtail-type optical sub-assembly. A type of the optical sub-assembly is not specifically limited in this application.

When the optical sub-assembly in this embodiment of this application is specifically designed and prepared, an optical path solution in which each transistor-outline package of the optical sub-assembly is independently coupled may be first designed. Then, a conventional transistor-outline package coupling and adhering process is used to complete bonding and curing between the transistor-outline package and the transistor body 120 of the optical sub-assembly in this embodiment of this application. Light seeking is performed by using an automatic coupling algorithm, so that responsivity of both the second light ray 011 and the third light ray 012 meets a specification requirement. Then, a remaining transmitting transistor-outline package is assembled by using a conventional three-piece coupling welding process.

An embodiment of this application further provides an optical module. The optical module includes a housing and the optical sub-assembly in the foregoing embodiment. The foregoing optical sub-assembly is mounted on the housing. In a specific embodiment, the optical sub-assembly has an adapter, the housing has an optical fiber interface, and the optical fiber interface is opposite to the adapter. Therefore, the optical fiber may be connected to the adapter of the optical sub-assembly through the optical fiber interface, to transmit an optical signal. The housing of the optical module may further have a structure such as a circuit board and a chip disposed on the circuit board. A pin of the transistor-outline package is connected to the chip on the circuit board, so that the chip can process a signal sent to the transistor-outline package or process a signal received by the transistor-outline package. This solution helps reduce a volume of the optical module, and implement miniaturization of the optical module. In addition, costs of the optical module may be reduced.

Figure 11:
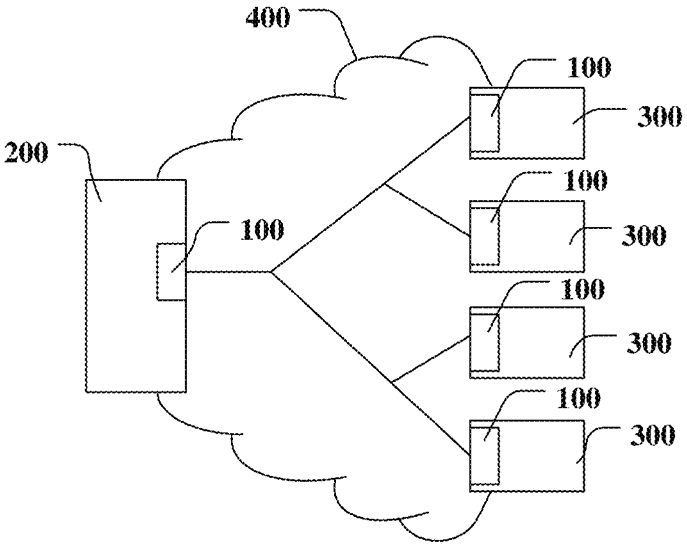
FIG. 11 is a schematic diagram of an optical network system according to an embodiment of this application.

An embodiment of this application further provides an optical network system. FIG. 11 is a schematic diagram of the optical network system according to an embodiment of this application. As shown in FIG. 11, the optical network system may be specifically a passive optical network system. The optical network system includes an optical line terminal 200 (OLT) and an optical network unit 300 (ONU). The optical line terminal 200 is connected to the optical network unit 300 by using a passive optical distribution network 400. The optical line terminal 200 includes an optical sub-assembly, or the optical network unit 300 includes the optical sub-assembly. The optical sub-assembly is a basis for normal communication of an entire network. The optical sub-assembly in this solution has a small volume and low costs, to help reduce a volume and costs of the optical network system.

Still referring to FIG. 11, this application further provides an optical network apparatus. The optical network apparatus may be specifically an optical network terminal or an optical network unit 300, and the optical network apparatus includes the optical sub-assembly in any one of the foregoing embodiments. The optical sub-assembly in this solution has a small volume and low costs, to help reduce a volume and costs of the optical network apparatus.

The following describes the passive optical network system and the optical network apparatus in embodiments of this application with reference to FIG. 11. In a specific embodiment, the foregoing passive optical network system includes at least one optical line terminal 200, a plurality of optical network units 300, and one passive optical distribution network 400 (ODN). The optical line terminal 200 and the optical network units 300 are the optical network apparatus. The optical line terminal 200 is connected to the plurality of optical network units 300 in a point-to-multipoint manner by using the passive optical distribution network 400. A TDM mechanism, a WDM mechanism, or a hybrid TDM/WDM mechanism may be used for communication between the optical line terminal 200 and the optical network units 300. A direction from the optical line terminal 200 to the optical network units 300 is defined as a downlink direction, and a direction from the optical network units 300 to the optical line terminal 200 is defined as an uplink direction.

The passive optical network system may be a communication network in which any active device is not required to implement data distribution between the optical line terminal 200 and the optical network units 300. In an embodiment, the data distribution between the optical line terminal 200 and the optical network units 300 may be implemented by using a passive optical sub-assembly (for example, a light splitter) in the passive optical distribution network 400. The passive optical network system may be an asynchronous transfer mode passive optical network (ATM PON) system or a broadband passive optical network (BPON) system defined in the ITU-T G.983 standard, a gigabit-capable passive optical network (GPON) system defined in the ITU-T G.984 series standard, an Ethernet passive optical network (EPON), a wavelength division multiplexing passive optical network (WDM PON) system, or a next generation access passive optical network (NGA PON system defined in IEEE 802.3ah standard, for example, an XGPON system defined in the ITU-T G.987 series standard, a 10 G EPON system or a hybrid TDM/WDM PON system defined in the IEEE 802.3ah standard), or the like. Various passive optical network systems defined by the foregoing standards are incorporated in this application document by reference in their entireties.

The optical line terminal 200 is usually located at a central location (for example, a central office, CO), and can manage all the plurality of optical network units 300. The optical line terminal 200 may serve as a medium between the optical network units 300 and an upper-layer network (not shown in the figure), to forward data received from the upper-layer network as downlink data to the optical network units 300, and forward uplink data received from the optical network units 300 to the upper-layer network. A specific structure configuration of the optical line terminal 200 may vary according to a specific type of the passive optical network system. In an embodiment, the optical line terminal 200 includes an optical sub-assembly and a data processing module (not shown in the figure). The optical sub-assembly may convert downlink data processed by the data processing module into a downlink optical signal, and send the downlink optical signal to the optical network units 300 by using the passive optical distribution network 400. The optical sub-assembly may receive an uplink optical signal sent by the optical network units 300 by using the passive optical distribution network 400, convert the uplink data signal into an electrical signal, and provide the electrical signal to the data processing module for processing.

The optical network units 300 may be disposed at a location on a customer side (for example, customer premises) in a distributed manner. The optical network unit 300 may be a network device configured for communication between the optical line terminal 200 and a user. Specifically, the optical network unit 300 may serve as a medium between the optical line terminal 200 and the user. For example, the optical network unit 300 may forward downlink data received from the optical line terminal 200 to the user, and forward data received from the user as uplink data to the optical line terminal 200. A specific structural configuration of the optical network unit 300 may vary with a specific type of the passive optical network system. In an embodiment, the optical network unit 300 includes an optical sub-assembly. The optical sub-assembly is configured to receive a downlink data signal sent by the optical line terminal 200 by using the passive optical distribution network 400, and send an uplink data signal to the optical line terminal 200 by using the passive optical distribution network 400. It should be understood that in this application, a structure of the optical network unit 300 is similar to a structure of the optical network terminal (ONT). Therefore, in the solutions provided in this application, the optical network unit 300 and the optical network terminal are interchangeable.

The passive optical distribution network 400 may be a data distribution system, and may include an optical fiber, an optical coupler, an optical multiplexer/demultiplexer, a light splitter, and/or another device. In an embodiment, the optical fiber, the optical coupler, the optical multiplexer/demultiplexer, the light splitter, and/or another device each may be a passive optical sub-assembly. Specifically, the optical fiber, the optical coupler, the optical multiplexer/demultiplexer, the light splitter, and/or another device each may be a device for distributing data signals between the optical line terminal 200 and the optical network units 300 without needing support of a power supply. In addition, in another embodiment, the passive optical distribution network 400 may further include one or more processing devices, for example, an optical amplifier, or a relay device. In a branch structure shown in FIG. 1, the passive optical distribution network 400 may specifically extend from the optical line terminal 200 to the plurality of optical network units 300, or may be configured as any other point-to-multipoint structure.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A transistor-outline package, comprising:
- a transistor base;
- a transistor cap disposed on a first side surface of the transistor base, wherein the transistor cap and the transistor base form an accommodation cavity;
- a first lens disposed on a top of the transistor cap and penetrating the transistor cap, wherein the first lens is configured to collimate a first light ray transmitted by an optical fiber and emit the first light ray into the accommodation cavity;
- a light filtering assembly disposed on a side of the accommodation cavity that is behind the first lens, wherein the light filtering assembly is configured to receive the first light ray and split the first light ray into a second light ray and a third light ray;
- a lens assembly disposed in the accommodation cavity and located on a side of the light filtering assembly that is behind the light filtering assembly, wherein the lens assembly comprises a second lens and a third lens, wherein the second lens receives the second light ray and converges the second light ray, and wherein the third lens receives the third light ray and converges the third light ray;
- a first optical receiving chip disposed in the accommodation cavity and located on the first side surface of the transistor base, and wherein the first optical receiving chip is configured to receive the second light ray; and
- a second optical receiving chip disposed in the accommodation cavity and located on the first side surface of the transistor base, and wherein the second optical receiving chip is configured to receive the third light ray.

2. The transistor-outline package according to claim 1, wherein the second lens and the third lens are of an integrated structure.

3. The transistor-outline package according to claim 2, wherein the lens assembly further comprises a fastening part, the fastening part, the second lens, and the third lens are of the integrated structure, and wherein the fastening part is mounted on the transistor base, and wherein the light filtering assembly is mounted on the fastening part.

4. The transistor-outline package according to claim 2, wherein the lens assembly comprises a plastic lens assembly.

5. The transistor-outline package according to claim 1, wherein the first lens comprises a hemispherical lens.

6. The transistor-outline package according to claim 1, wherein the light filtering assembly comprises a first light filter, a second light filter, and a third light filter, wherein the first light filter is opposite to the second lens, and wherein the first light filter is configured to transmit the second light ray and reflect a light ray other than the second light ray, wherein the second light filter is disposed between the first light filter and the third light filter, and wherein the second light filter is configured to reflect the light ray reflected by the first light filter to the third light filter, wherein the third light filter is opposite to the third lens, and wherein the third light filter is configured to transmit the third light ray.

7. An optical sub-assembly comprising a transistor body and at least one transistor-outline package according to claim 1, wherein the transistor body comprises an inner cavity, wherein the inner cavity is configured to transmit a light ray, wherein the transistor-outline package is mounted on a transistor wall of the transistor body, and wherein the first lens faces the inner cavity and receives the first light ray.

8. The optical sub-assembly according to claim 7, further comprising an adapter, wherein the adapter is mounted on the transistor body and wherein the adapter is configured to connect the optical fiber, wherein the optical fiber is connected to the inner cavity, and wherein the light ray is transmitted between the optical fiber and the inner cavity.

9. An optical module, comprising a housing and an optical sub-assembly comprising a transistor body and at least one transistor-outline package, which comprises:

a transistor base;

a transistor cap disposed on a first side surface of the transistor base, wherein the transistor cap and the transistor base form an accommodation cavity;

a first lens disposed on a top of the transistor cap and penetrating the transistor cap, wherein the first lens is configured to collimate a first light ray transmitted by an optical fiber and emit the first light ray into the accommodation cavity;

a light filtering assembly disposed on a side of the accommodation cavity that is behind the first lens, wherein the light filtering assembly is configured to receive the first light ray and split the first light ray into a second light ray and a third light ray;

a lens assembly disposed in the accommodation cavity and located on a side of the light filtering assembly that is behind the light filtering assembly, wherein the lens assembly comprises a second lens and a third lens, wherein the second lens receives the second light ray and converges the second light ray, and wherein the third lens receives the third light ray and converges the third light ray;

a first optical receiving chip disposed in the accommodation cavity and located on the first side surface of the transistor base, and wherein the first optical receiving chip is configured to receive the second light ray; and a second optical receiving chip disposed in the accommodation cavity and located on the first side surface of the transistor base, and wherein the second optical receiving chip is configured to receive the third light ray, wherein the transistor body comprises an inner cavity, wherein the inner cavity is configured to transmit a light ray, wherein the transistor-outline package is mounted on a transistor wall of the transistor body, and wherein the first lens faces the inner cavity and receives the first light ray, and wherein the optical sub-assembly is mounted on the housing, wherein the housing comprises an optical fiber interface, wherein the optical fiber interface is opposite to an adapter mounted on the transistor body, and wherein the optical fiber is connected to the adapter through the optical fiber interface.

10. The optical module according to claim 9, wherein the second lens and the third lens are of an integrated structure.

11. The optical module according to claim 10, wherein the lens assembly further comprises a fastening part, the fastening part, the second lens, and the third lens are of the integrated structure, and wherein the fastening part is mounted on the transistor base, and wherein the light filtering assembly is mounted on the fastening part.

12. The optical module according to claim 10, wherein the lens assembly comprises a plastic lens assembly.

13. The optical module according to claim 9, wherein the first lens comprises a hemispherical lens.

14. The optical module according to claim 9, wherein the light filtering assembly comprises a first light filter, a second light filter, and a third light filter, wherein the first light filter is opposite to the second lens, and wherein the first light filter is configured to transmit the second light ray and reflect a light ray other than the second light ray, wherein the second light filter is disposed between the first light filter and the third light filter, and wherein the second light filter is configured to reflect the light ray reflected by the first light filter to the third light filter, wherein the third light filter is opposite to the third lens, and wherein the third light filter is configured to transmit the third light ray.

15. A system, the system comprising an optical line terminal and an optical network unit, wherein the optical line terminal is connected to the optical network unit by using a passive optical distribution network, the optical line terminal comprising an optical sub-assembly or the optical network unit comprising the optical sub-assembly, the optical sub-assembly comprising a transistor body and at least one transistor-outline package, the system further comprising:

a transistor base;

a transistor cap disposed on a first side surface of the transistor base, wherein the transistor cap and the transistor base form an accommodation cavity;

a first lens disposed on a top of the transistor cap and penetrating the transistor cap, and wherein the first lens is configured to collimate a first light ray transmitted by an optical fiber and emit the first light ray into the accommodation cavity;

a light filtering assembly disposed on a side of the accommodation cavity that is behind the first lens, wherein the light filtering assembly is configured to receive the first light ray and split the first light ray into a second light ray and a third light ray;

a lens assembly disposed in the accommodation cavity and located on a side of the light filtering assembly that is behind the light filtering assembly, wherein the lens assembly comprises a second lens and a third lens, wherein the second lens receives the second light ray and converges the second light ray, and wherein the third lens receives the third light ray and converges the third light ray;

a first optical receiving chip, the lens assembly disposed in the accommodation cavity, and located on the first side surface of the transistor base, and wherein the first optical receiving chip is configured to receive the second light ray; and a second optical receiving chip disposed in the accommodation cavity and located on the first side surface of the transistor base, and wherein the second optical receiving chip is configured to receive the third light ray, wherein the transistor body comprises an inner cavity, wherein the inner cavity is configured to transmit a light ray, wherein the transistor-outline package is mounted on a transistor wall of the transistor body, and wherein the first lens faces the inner cavity and receives the first light ray.

16. The system according to claim 15, wherein the second lens and the third lens are of an integrated structure.

17. The system according to claim 15, wherein the light filtering assembly comprises a first light filter, a second light filter, and a third light filter, wherein the first light filter is opposite to the second lens, and wherein the first light filter is configured to transmit the second light ray and reflect a light ray other than the second light ray, wherein the second light filter is disposed between the first light filter and the third light filter, and wherein the second light filter is configured to reflect the light ray reflected by the first light filter to the third light filter, wherein the third light filter is opposite to the third lens, and wherein the third light filter is configured to transmit the third light ray.

* * * * *